US011649754B2

(12) United States Patent
De Cesare et al.

(10) Patent No.: US 11,649,754 B2
(45) Date of Patent: May 16, 2023

(54) METHOD TO CONTROL A BURNER FOR AN EXHAUST SYSTEM OF AN INTERNAL COMBUSTION ENGINE

(71) Applicant: MARELLI EUROPE S.P.A., Corbetta (IT)

(72) Inventors: Matteo De Cesare, Torremaggiore (IT); Enrico Brugnoni, Perugia (IT); Marco Panciroli, Bologna (IT); Federico Stola, Bologna (IT)

(73) Assignee: MARELLI EUROPE S.P.A., Corbetta (IT)

( * ) Notice: Subject to any disclaimer, the term of this patent is extended or adjusted under 35 U.S.C. 154(b) by 0 days.

(21) Appl. No.: 17/809,853

(22) Filed: Jun. 29, 2022

(65) Prior Publication Data

US 2023/0003155 A1 Jan. 5, 2023

(30) Foreign Application Priority Data

Jun. 30, 2021 (IT) ........................ 102021000017258

(51) Int. Cl.
*F01N 3/00* (2006.01)
*F01N 3/20* (2006.01)
(Continued)

(52) U.S. Cl.
CPC ............. *F01N 3/2033* (2013.01); *F01N 3/32* (2013.01); *F01N 3/36* (2013.01); *F01N 2240/14* (2013.01);
(Continued)

(58) Field of Classification Search
CPC . F01N 3/2033; F01N 3/32; F01N 3/36; F01N 2240/14; F01N 2610/03;
(Continued)

(56) References Cited

U.S. PATENT DOCUMENTS

2003/0221425 A1* 12/2003 Posselt .................. F01N 3/2033 60/303
2010/0154745 A1* 6/2010 Gaiser ..................... F23N 1/022 431/89

(Continued)

FOREIGN PATENT DOCUMENTS

JP 2007146700 A * 6/2007 ......... F01N 13/0097
WO WO-2012164661 A1 * 12/2012 ........... F01N 3/0814

OTHER PUBLICATIONS

Search Report for Italian Patent Application No. 202100017258 dated Mar. 3, 2022.

*Primary Examiner* — Matthew T Largi

(74) *Attorney, Agent, or Firm* — Howard & Howard Attorneys PLLC

(57) ABSTRACT

A method to control a burner for an exhaust system of an internal combustion engine with an exhaust gas after-treatment system including at least one catalytic converter. The method provides the steps of calculating the thermal power needed to reach the nominal operating temperature of the at least one catalytic converter and determining an actual number of revolutions with which to operate a fresh air pumping device based on the sum of a nominal number of revolutions, a closed-loop contribution of the number of revolutions with which to operate the fresh air pumping device, and a further contribution of the number of revolutions with which to operate the fresh air pumping device in order to ensure optimal thermal power exiting the burner.

10 Claims, 8 Drawing Sheets

(51) Int. Cl.
*F01N 3/36* (2006.01)
*F01N 3/32* (2006.01)

(52) U.S. Cl.
CPC .. *F01N 2610/03* (2013.01); *F01N 2900/0408* (2013.01); *F01N 2900/0412* (2013.01); *F01N 2900/08* (2013.01); *F01N 2900/12* (2013.01); *F01N 2900/1402* (2013.01)

(58) Field of Classification Search
CPC ..... F01N 2900/0408; F01N 2900/0412; F01N 2900/08; F01N 2900/12; F01N 2900/1402
See application file for complete search history.

(56) References Cited

U.S. PATENT DOCUMENTS

| | | | | |
|---|---|---|---|---|
| 2011/0289906 | A1 | 12/2011 | Morley et al. | |
| 2012/0117949 | A1 * | 5/2012 | Miebach | F01N 3/0231 60/299 |
| 2018/0223713 | A1 * | 8/2018 | Andreis | F04B 49/08 |

* cited by examiner

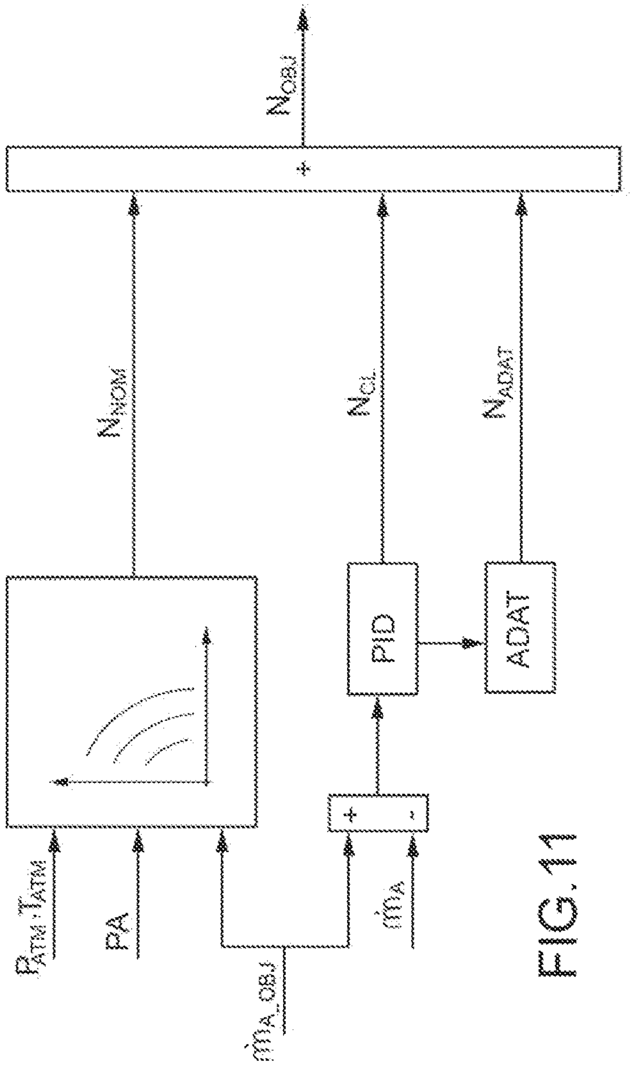
FIG. 11
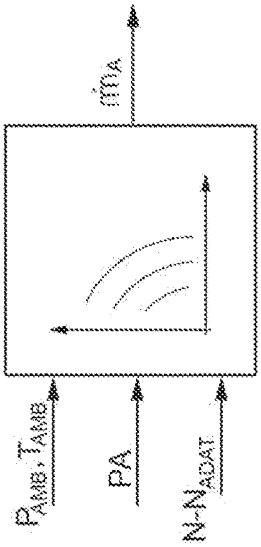
FIG. 12
FIG. 10
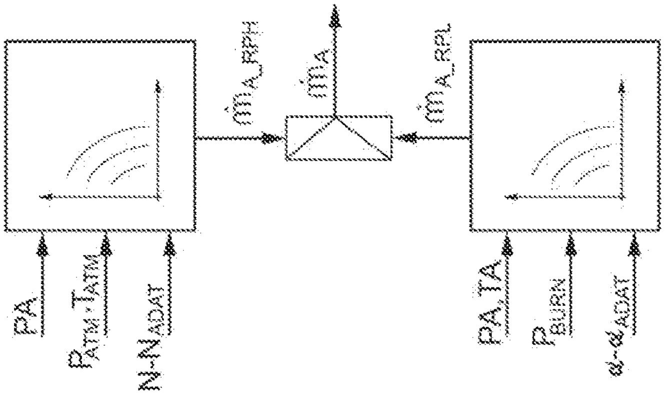

METHOD TO CONTROL A BURNER FOR AN EXHAUST SYSTEM OF AN INTERNAL COMBUSTION ENGINE

CROSS-REFERENCE TO RELATED APPLICATIONS

This patent application claims priority from Italian patent application no. 102021000017258 filed on Jun. 30, 2021, the entire disclosure of which is incorporated herein by reference.

TECHNICAL FIELD

The present invention relates to a method to control a burner for an exhaust system of an internal combustion engine.

PRIOR ART

As is known, an internal combustion engine is typically provided with a number of cylinders, each of which is connected to an intake manifold and an exhaust manifold, to which an exhaust duct is connected which feeds the exhaust gases produced by combustion to an exhaust system, which emits the gases produced by combustion into the atmosphere.

An exhaust gas after-treatment system usually comprises a precatalytic converter arranged along the exhaust duct; a particulate filter also arranged along the exhaust duct, downstream of the precatalytic converter; and a catalytic converter arranged along the exhaust duct, upstream of the particulate filter.

Also provided along the exhaust duct are a first lambda sensor housed along the exhaust duct and arranged upstream of the precatalytic converter to detect the air/fuel ratio (or titer) of the exhaust gases entering the precatalytic converter; a second lambda sensor housed along the exhaust duct and interposed between the precatalytic converter and the assembly defined by the catalytic converter and by the particulate filter to detect the oxygen concentration inside the exhaust gases downstream of the precatalytic converter; and lastly, a third lambda sensor housed along the exhaust duct and arranged downstream of the assembly defined by the catalytic converter and by the particulate filter to detect the oxygen concentration inside the exhaust gases downstream of the assembly defined by the catalytic converter and by the particulate filter.

Lastly, the exhaust gas after-treatment system also comprises a burner suited to introduce the exhaust gases (and consequently heat) into the exhaust duct so as to speed up heating of the catalytic converter and so as to facilitate the regeneration of the particulate filter.

A combustion chamber is defined inside the burner, the chamber receives fresh air and receives fuel from an injector, which is designed to cyclically inject fuel inside the combustion chamber. In addition, a spark plug is coupled to the burner to determine the ignition of the mixture present inside the combustion chamber.

It is of utmost importance to be able to control the combustion that occurs inside the burner so as to ensure that the optimal thermal power and the desired/objective value of the air/fuel ratio of the exhaust gases exiting the burner are achieved.

For this reason, it has been proposed to house a further lambda sensor along a duct adapted to discharge the exhaust gases exiting the burner into the exhaust duct; said further lambda sensor is dedicated exclusively to detecting the air/fuel ratio of the exhaust gases exiting the burner. However, this solution is economically disadvantageous as it involves the use of a further lambda sensor.

To overcome this problem, it has been proposed to arrange the burner so as to introduce the exhaust gases into the exhaust duct between the first lambda sensor (so that the first lambda sensor is exclusively hit by the exhaust gases produced by the internal combustion engine) and the second lambda sensor (so that the second lambda sensor is hit by both the exhaust gases produced by the internal combustion engine and the exhaust gases produced by the burner); and use the signals coming from the first lambda sensor and from the second lambda sensor to control the burner and operate the air flow rate and fuel fed to the burner.

The document US2003221425 relates to a method to control an exhaust system of an internal combustion engine provided with a burner.

DESCRIPTION OF THE INVENTION

The aim of the present invention is to provide a method to control a burner for an exhaust system of an internal combustion engine which is free of the drawbacks described above and, in particular, is easy and inexpensive to implement.

According to the present invention, a method to control a burner for an exhaust system of an internal combustion engine is provided according to what is claimed in the appended claims.

BRIEF DESCRIPTION OF THE DRAWINGS

The present invention will now be described with reference to the appended drawings, which illustrate a non-limiting embodiment thereof, wherein:

FIGS. 9 and 10 are block diagrams that schematically illustrate a third variant of the method to control the air flow rate object of the present invention;

FIGS. 11 and 12 are block diagrams that schematically illustrate a fourth variant of the method to control the air flow object of the present invention.

PREFERRED EMBODIMENTS OF THE INVENTION

Figure 1:
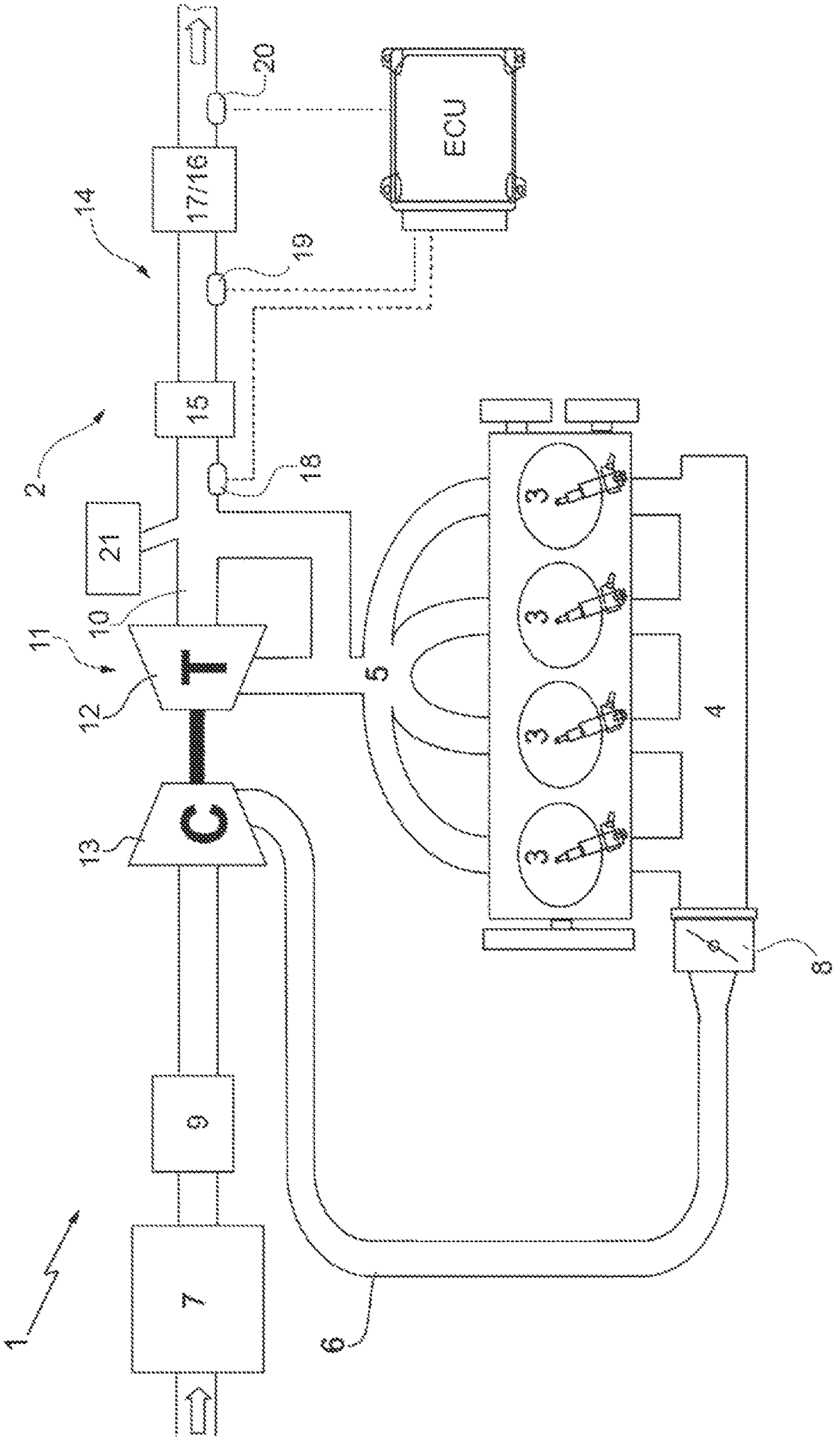
FIG. 1 schematically shows an internal combustion engine provided with a first variant of an exhaust gas after-treatment system having an electronic control unit that implements the control method obtained in accordance with the present invention.

In FIG. 1, indicated as a whole by the number 1 is a boosted internal combustion engine provided with an exhaust system 2 for the exhaust gases in a motor vehicle (not illustrated) and having a number of cylinders 3, each of which is connected to an intake manifold 4 and to an exhaust manifold 5 by at least one respective exhaust valve (not illustrated).

Also, according to a preferred embodiment, the following disclosure finds advantageous yet not exclusive application in the case of an internal combustion engine 1 in which the fuel fed is gasoline.

The intake manifold 4 receives air coming from the external environment through an intake duct 6, which is provided with an air filter 7 for the flow of fresh air and is regulated by a throttle valve 8. A mass air flow sensor 9 (better known as Air Flow Meter) is also arranged along the intake duct 6 downstream of the air filter 7.

The exhaust manifold 5 is connected to an exhaust duct 10 that feeds the exhaust gases produced by combustion to the exhaust system 2, which emits the gases produced by combustion into the atmosphere.

The boosting system of the internal combustion engine 1 comprises a turbocompressor 11 provided with a turbine 12, which is arranged along the exhaust duct 10 to rotate at high speed under the action of the exhaust gases expelled from the cylinders 3, and a compressor 13, which is arranged along the intake duct 6 and is mechanically connected to the turbine 12 to be dragged into rotation by said turbine 12 so as to increase the pressure of the air present in the intake duct 6.

The gas exhaust system 2 is provided with an exhaust gas after-treatment system 14 comprising a precatalytic converter 15 arranged along the exhaust duct 10, downstream of the turbocompressor 11 and a particulate filter 16 (also known as Gasoline Particulate Filter) also arranged along the exhaust duct 10, downstream of the precatalytic converter. According to a preferred embodiment, the exhaust after-treatment system 14 is provided with a catalytic converter 17 arranged along the exhaust duct 10, upstream of the particulate filter 16. According to a preferred embodiment, the catalytic converter 17 and the particulate filter 16 are arranged one after the other inside a common tubular container.

According to a first variant, the internal combustion engine 1 is also provided with a linear oxygen sensor 18 of the UHEGO or UEGO type housed along the exhaust duct 10 and interposed between the turbocompressor 11 and the precatalytic converter 15 so as to detect the air/fuel ratio (or titer) of the exhaust gases (providing a linear output indicating the content of oxygen in the exhaust gases) downstream of the turbocompressor 11 and upstream of the precatalytic converter 15.

The internal combustion engine is also provided with a lambda sensor 19 intended to provide a binary on/off type output indicating whether the exhaust gases titer is above or below the stoichiometric value, housed along the exhaust duct 10 and interposed between the precatalytic converter 15 and the assembly defined by the catalytic converter 17 and by the particulate filter 16 to detect the oxygen concentration inside the exhaust gases downstream of the precatalytic converter 15; and finally, a lambda sensor 20 suited to provide a binary on/off type output indicating whether the exhaust gases titer is above or below the stoichiometric value, housed along the exhaust duct 10 and arranged downstream of the assembly defined by the catalytic converter 17 and by the particulate filter 16 to detect the oxygen concentration inside the exhaust gases downstream of the assembly defined by the catalytic converter 17 and the particulate filter 16.

According to a second variant illustrated in FIG. 2, the internal combustion engine 1 is also provided with a lambda sensor 19* suited to provide a binary on/off type output indicating whether the exhaust gases titer is above or below the stoichiometric value, housed along the exhaust duct 10 and interposed between the turbocompressor 11 and the precatalytic converter 15 to detect the air/fuel ratio (or titer) of the exhaust gases downstream of the turbocompressor 11 and upstream of the precatalytic converter 15.

The internal combustion engine 1 is also provided with a UHEGO or UEGO type linear oxygen sensor 18* housed along the exhaust duct 10 and interposed between the precatalytic converter 15 and the assembly defined by the catalytic converter 17 and by the particulate filter 16 to detect the oxygen concentration inside the exhaust gases downstream of the precatalytic converter 15 (a linear output indicating the content of oxygen in the exhaust gases); and lastly, a lambda sensor 20 suited to provide a binary on/off type output indicating whether the exhaust gases titer is above or below the stoichiometric value, housed along the exhaust duct 10 and arranged downstream of the assembly defined by the catalytic converter 17 and by the particulate filter 16 to detect the oxygen concentration inside the exhaust gases downstream of the assembly defined by the catalytic converter 17 and by the particulate filter 16.

The exhaust gas after-treatment system 14 then comprises a burner 21 suited to introduce exhaust gases (and consequently heat) into the exhaust duct 10 so as to speed up the heating of the precatalytic converter 15 and/or of the catalytic converter 17 and so as to facilitate the regeneration of the particulate filter 16.

Figure 3:
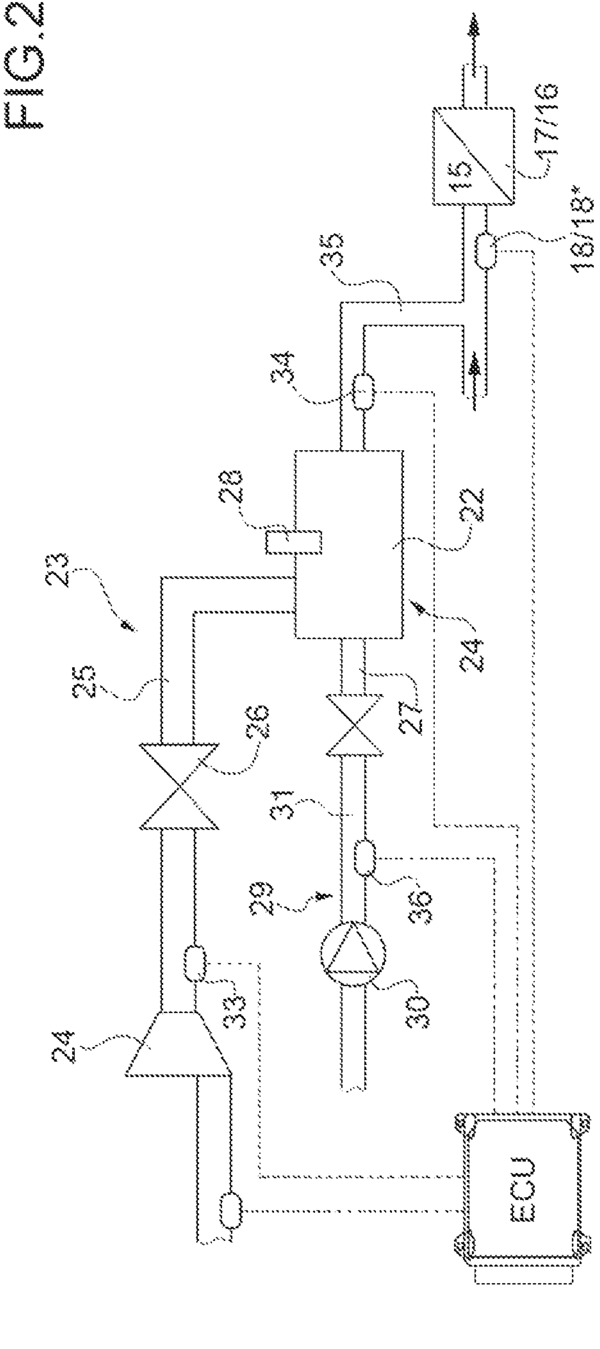
FIG. 3 schematically illustrates a detail of the exhaust gas after-treatment system illustrated in FIGS. 1 and 2.

According to what is better illustrated in FIG. 3, a combustion chamber 22 is defined inside the burner 21, the chamber receives fresh air (i.e., air coming from the outside environment) through an air feeding circuit 23 provided with a pumping device 24 that feeds the air by means of a duct 25 regulated by an on/off type shut-off valve 26. The combustion chamber 22 also receives fuel from an injector 27 designed to cyclically inject fuel inside the combustion chamber 22. In addition, a spark plug 28 is coupled to the burner 21 to determine the ignition of the mixture present inside said combustion chamber 22. The internal combustion engine 1 then comprises a fuel feeding circuit 29 provided with a pumping device 30 that feeds the fuel by means of a duct 31.

Lastly, the internal combustion engine 1 comprises a control system 32 which is adapted to oversee the operation of said internal combustion engine 1. The control system 32 comprises at least one electronic control unit (normally referred to as an “ECU”—“Electronic Control Unit”), which oversees the operation of the various components of the internal combustion engine 1.

The spark plug 28 is operated by the electronic control unit ECU to make a spark between its electrodes and therefore determine the ignition of the gases compressed inside the combustion chamber 22. The control system 32 also comprises a plurality of sensors connected to the electronic control unit ECU.

The sensors comprise, in particular, a sensor 33 for the temperature and pressure of the air flow fed to the burner 21 preferably housed along the duct 25; a sensor 34 for the temperature and pressure of the exhaust gases exiting the burner 21 housed along an outlet duct 35 for discharging the exhaust gases exiting the burner 21 into the exhaust duct 10; a sensor 36 for the pressure of fuel fed to the burner 21 housed along the duct 31; and a sensor 37 for the pressure and temperature of the air flow fed to the pumping device 24.

The electronic control unit ECU is also connected to the UHEGO or UEGO type linear oxygen sensor 18, 18* and to the lambda sensors 19, 19*, 20.

According to a first embodiment illustrated in FIG. 1, the burner 21 is arranged so as to introduce the exhaust gases into the exhaust duct 10 upstream of the UHEGO or UEGO type linear oxygen sensor 18 and upstream of the precatalytic converter 15.

Figure 2:
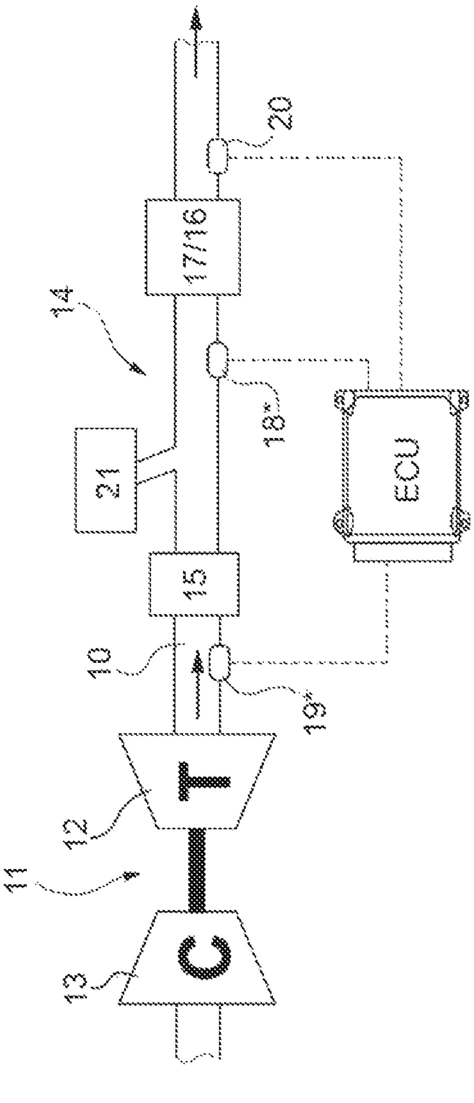
FIG. 2 illustrates a second variant of the exhaust gas after-treatment system of FIG. 1.

According to a second embodiment illustrated in FIG. 2, the burner 21 is arranged so as to introduce the exhaust gases into the exhaust duct 10 upstream of the UHEGO or UEGO type linear oxygen sensor 18* and upstream of the assembly defined by the catalytic converter 17 and by the particulate filter 16.

The method implemented by the electronic control unit ECU to control the burner 21 is described in the following.

Firstly, the strategy described in the following disclosure may be implemented exclusively when the UHEGO or UEGO type linear oxygen sensor 18, 18* is hit exclusively by the exhaust gases produced by the burner 21 (in other words, it is necessary that the UHEGO or UEGO type linear oxygen sensor 18, 18* is not hit by the exhaust gases produced by the internal combustion engine 1).

Therefore, the condition of enabling the control strategy for the burner 21 is that said burner 21 is turned on and the internal combustion engine 1 is instead turned off.

In particular, the following two conditions may occur alternatively:

a) burner 21 turned on with the "cold" exhaust system 2 (i.e., with a detected temperature below a limit value, ranging from 180° C. to 200° C.); or b) burner 21 turned on with the "hot" exhaust system 2 (i.e., with a detected temperature above a limit value, ranging from 180° C. to 200° C.).

The condition a) may occur in any of the following cases:

$a_1$) the burner 21 is turned on when the door of the driver of the motor vehicle is opened (the opening is detected by means of a sensor or when the door is unlocked by remote control or even when the smart key is detected in proximity to the vehicle); $a_2$) the burner 21 is turned on when the motor vehicle is a hybrid vehicle that is started in electric mode and the internal combustion engine 1 has not been turned on yet after the motor vehicle has been started;

$a_3$) the burner 21 is turned on when the vehicle is a hybrid vehicle running in electric mode and the electronic control unit ECU provides for switching to thermal mode (for example, in the case where the State Of Charge of a storage system is not sufficient to proceed in electric mode); in this case, the burner 21 is turned on about 3 to 5 seconds before the start of the internal combustion engine 1.

It is clear that, alternatively, in the case where the burner 21 is arranged so as to introduce the exhaust gases into the exhaust duct 10 upstream of the UHEGO or UEGO type linear oxygen sensor 18* and upstream of the assembly defined by the catalytic converter 17 and by the particulate filter 16 (in other words, in the case where the burner 21 is interposed between the precatalytic converter 15 and the assembly defined by the catalytic converter 17 and by the particulate filter 16), the strategy described in the following disclosure may also be implemented in the case where the internal combustion engine 1 is turned on since the exhaust gases produced by the internal combustion engine 1 have already passed through the precatalytic converter 15.

The burner 21 is then turned off if any of the following conditions occur:

a temperature of the exhaust system 2 above a limit value ranging from 180° C. to 200° C. is detected; or when a predetermined amount of time has elapsed since the burner 21 was turned on; or in the case where the estimated energy supplied, for example, by means of the integral of the fuel flow rate exceeds a threshold value;

in the case where no passenger is detected to be present on board the motor vehicle for a predetermined amount of time by means of at least one recognition device housed in the passenger compartment (such as, for example, a sensor in a seat of the driver of the motor vehicle, or a sensor of the seat belt of the driver of the motor vehicle).

The condition b) may, on the other hand, occur in any of the following cases:

b1) the burner 21 is turned on when the motor vehicle is a hybrid vehicle running in electric mode with the internal combustion engine 1 turned off;

b2) the burner 21 is turned on during the release phase with the open clutch; and b3) the burner 21 is turned on during all the stopping phases of the motor vehicle; for example, the burner 21 is turned on during the stopping phases for a motor vehicle provided with the "Start and Stop" system, during parking manoeuvres of the motor vehicle, or even during the "after run" phase that allows the ventilation to be activated after the internal combustion engine 1 is turned off.

The burner 21 is then turned off in the case where any of the following conditions occur:

c) the internal combustion engine 1 is turned on;

d) a predetermined amount of time has elapsed since the burner 21 was turned on; or e) the adaptive strategy outlined in the following disclosure has been completed.

The strategy implemented by the electronic control unit ECU to operate the burner 21 is described below.

Firstly, the electronic control unit ECU is designed to calculate the thermal power $P_{OBJ}$ required to reach the nominal operating temperature $T_{CAT\_OBJ}$ of the precatalytic converter 15 or the catalytic converter 17 and obtained with the objective value $\lambda_{OBJ}$ of the air/fuel ratio.

To calculate the thermal power $P_{OBJ}$, it should be considered that the objective is to heat the precatalytic converter 15 or the catalytic converter 17 from an initial temperature $T_0$ up to the nominal operating temperature $T_{CAT\_OBJ}$; the heat $Q_{CAT}$ required to allow this temperature increase may be calculated as follows:

$$Q_{CAT}=C_{CAT}*M_{CAT}*(T_{CAT\_OBJ}-T_0)$$

where $C_{CAT}$ is the specific heat of the precatalytic converter 15 or the catalytic converter 17 and MCAT represents the mass of the precatalytic converter 15 or the catalytic converter 17 (in essence, the product $C_{CAT}$*$M_{CAT}$ represents the thermal capacity of the precatalytic converter 15 or the catalytic converter 17).

In order to heat the precatalytic converter 15 or the catalytic converter 17 in an amount of time Δt and taking into account heat losses $Q_{DISS}$ (by convection, gases leaving the catalytic converter, etc.), the thermal capacity $P_{OBJ}$ required is therefore given by:

$$P_{OBJ}=(Q_{CAT}+Q_{DISS})/\Delta t$$

The thermal power $P_t$ released by the combustion in the burner 21 with an air flow $\dot{m}_A$ and titer z may instead be calculated as follows:

$$P_t = \dot{m}_A/\lambda_{ST}*[1/(MAX(1,\lambda)*H_i*\eta_c-(1/MIN(\lambda,1)-1*H_v]$$

where $\lambda_{ST}$ is the stoichiometric air/fuel ratio;

$\lambda$ is the combustion titer;

$\dot{m}_A$ is the air mass flow rate;

$H_i$ is the lower heating power of the fuel;

$H_v$ is the latent heat of vaporization of the fuel; and $\eta_c$ is the combustion efficiency.

Therefore, once the combustion air/fuel ratio (or titer) $\lambda$ is defined, the air flow rate $\dot{m}_A$ required to heat the precatalytic converter 15 or the catalytic converter 17 from an initial temperature $T_0$ to the nominal operating temperature $T_{CAT\_OBJ}$ may be calculated, in the case where the internal combustion engine 1 is turned off, as follows:

$$\dot{m}_A=(C_{CAT}*M_{CAT}*(T_{CAT\_OBJ}-T_0)+Q_{DISS})/\Delta t)*\lambda_{ST}/[1/(MAX(1,\lambda)*H_i*\eta_c-(1/MIN(\lambda,1)-1)*H_v]$$

In the case where the internal combustion engine 1 is turned on, the contribution due to the heat $Q_{ENGINE}$ (positive if supplied or negative if subtracted) generated for the exchange of exhaust gases may be added as follows:

$$\dot{m}_A=(C_{CAT}*M_{CAT}*(T_{CAT\_OBJ}-T_0)++Q_{DISS}-Q_{ENGINE})/\Delta t)*\lambda_{ST}/[1/(MAX(1,\lambda)*H_i*\eta_c-(1/MIN(\lambda,1)-1)*H_v]$$

Depending on the thermal power $P_{OBJ}$ required to reach the nominal operating temperature $T_{CAT\_OBJ}$ of the precatalytic converter 15 or of the catalytic converter 17, the electronic control unit ECU determines both the objective air flow rate $\dot{m}_{A\_OBJ}$ and the nominal fuel flow rate $\dot{m}_{F\_N}$.

According to a first variant, the pumping device 24 is regulated by controlling the number N of revolutions while the shut-off valve 26 is of the on/off type.

The electronic control unit ECU is then designed to determine the objective air flow rate $\dot{m}_{A\_OBJ}$ and the nominal fuel flow rate $\dot{m}_{F\_N}$, which are obtained by operating the pumping device 24, the shut-off valve 26, the pumping device 30 and the injector 27.

Figure 4:
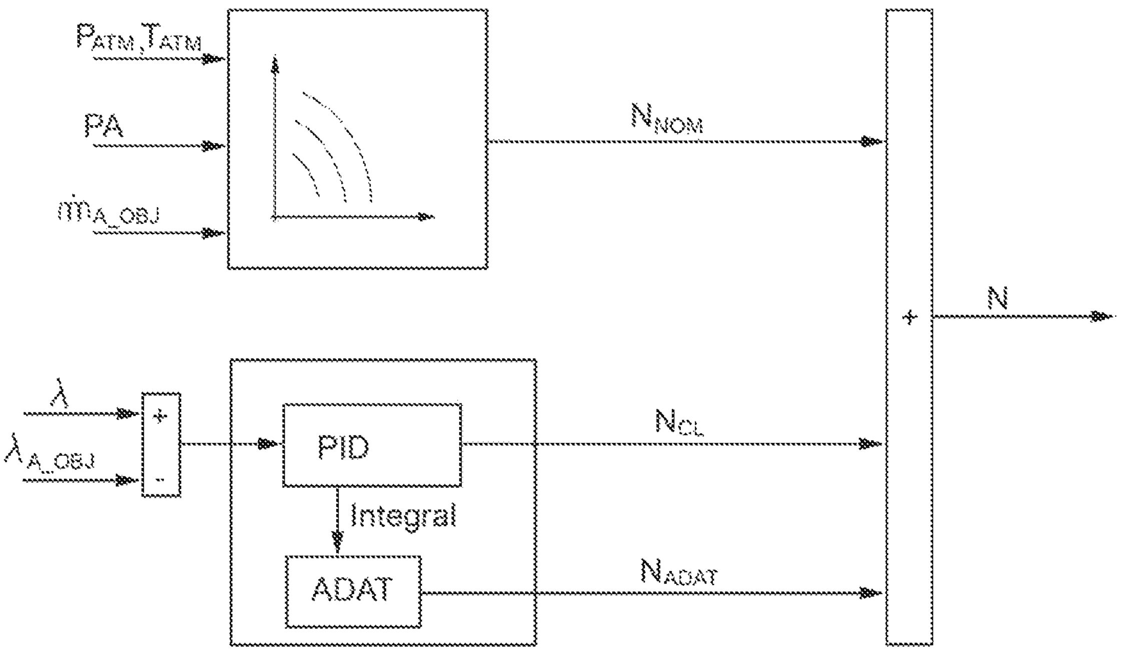
FIGS. 4 and 6 are block diagrams that schematically illustrate a first variant of the method to control the air flow rate object of the present invention.

According to what is illustrated schematically in FIG. 4, the objective air flow rate $\dot{m}_{A\_OBJ}$ is provided at input to a map (typically provided by the manufacturer of the pumping device 24) together with further quantities that comprise the ambient pressure $P_{ATM}$ and the ambient temperature $T_{ATM}$ provided by the sensor 37 and the pressure $P_A$ of the air in the duct 25 provided by the sensor 33. The map provides at output the nominal number $N_{NOM}$ of revolutions with which to operate the pumping device 24.

However, the actual number N of revolutions with which to operate the pumping device 24 is defined by the sum of the nominal number $N_{NOM}$ of revolutions and two further contributions.

In particular, the nominal number $N_{NOM}$ of revolutions with which to operate the pumping device 24 represents the open-loop contribution and is precisely generated using the experimentally derived control map; while the closed-loop contribution $N_{CL}$ is provided by means of a PID controller which tries to zero an error in the air/fuel ratio, namely, a difference between the objective value $\lambda_{OBJ}$ of the air/fuel ratio and the actual value $\lambda$ of the air/fuel ratio measured by the UHEGO or UEGO type linear oxygen sensor 18, 18*.

The third contribution $N_{ADAT}$ is also determined depending on the integral action of the PID controller under stationary conditions (i.e., with stationary air flow rate $\dot{m}_A$ and fuel flow rate $\dot{m}_F$).

Figure 6:
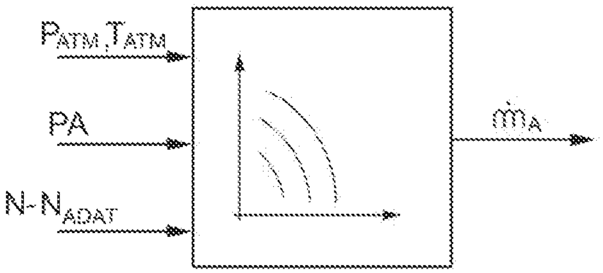

According to what is illustrated in FIG. 6, the third contribution $N_{ADAT}$ with which to operate the pumping device 24 is then used to update the map used previously to determine the nominal number $N_{NOM}$ of revolutions. In particular, the third contribution $N_{ADAT}$ is provided at input to the map together with further quantities that comprise the ambient pressure $P_{ATM}$ and the ambient temperature $T_{ATM}$ provided by the sensor 37 and the pressure $P_A$ of the air in the duct 25 provided by the sensor 33. The map provides at output the updated value of the estimated air flow rate $\dot{m}_A$.

In the case where the sum of the closed-loop contribution $N_{CL}$ and of the third contribution $N_{ADAT}$ is greater than a calibratable threshold value $THR_1$, a breakdown or fault is diagnosed.

According to a second variant, the pumping device 24 is not regulated by controlling the number N of revolutions while the shut-off valve 26 is produced with the variable/adjustable passage section (in other words, the shut-off valve 26 is not of the on/off type). In this case, a pressure sensor 38 is also provided in the duct 25 downstream of the shut-off valve 26 to detect the pressure of the air being fed to the burner 21.

The electronic control unit ECU is therefore designed to determine the objective air flow rate $\dot{m}_{A\_OBJ}$ and the nominal fuel flow rate $\dot{m}_{F\_N}$ that are obtained by operating the shut-off valve 26, the pumping device 30 and the injector 27.

Figure 7:
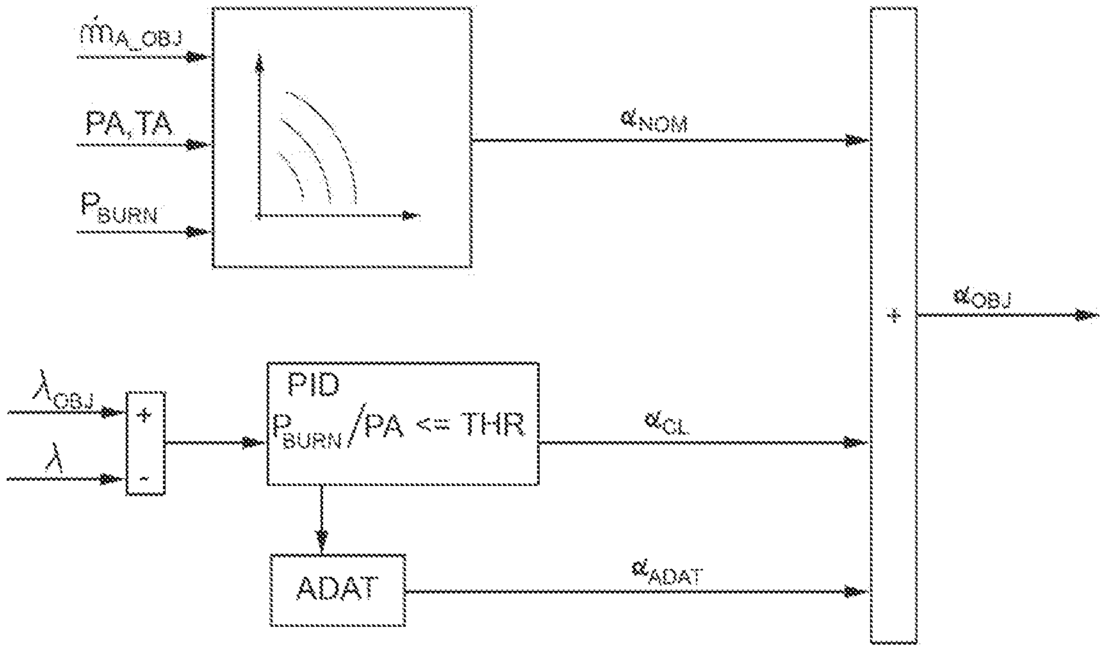
FIGS. 7 and 8 are block diagrams that schematically illustrate a second variant of the method to control the air flow rate object of the present invention.

According to what is illustrated schematically in FIG. 7, the objective air flow rate $\dot{m}_{A\_OBJ}$ is provided at input to a map (typically provided by the manufacturer of the shut-off valve 26) together with further quantities that comprise the pressure $P_A$ and the temperature $T_A$ of the air provided by the sensor 33 and the pressure $P_{BURN}$ of the air being fed to the burner 21 provided by the sensor 38. The map provides at output the nominal passage section $\propto_{NOM}$ with which to operate the shut-off valve 26.

The actual passage section $\propto_{OBJ}$ with which to operate the shut-off valve 26 is, however, defined by the sum of the nominal passage section $\propto_{NOM}$ and two further contributions.

In particular, the nominal passage section $\propto_{NOM}$ with which to operate the shut-off valve 26 represents the open-loop contribution and is precisely generated using the experimentally derived control map. In the case where the ratio between the pressure $P_{BURN}$ of the air being fed to the burner 21 and the pressure $P_A$ of the air is less than or equal to a threshold value THR, the closed-loop contribution $\propto_{CL}$ is provided by means of a PID controller which tries to zero an error in the air/fuel ratio, namely, a difference between the objective value $\lambda_{OBJ}$ of the air/fuel ratio and the actual value $\lambda$ of the air/fuel ratio measured by the UHEGO or UEGO type linear oxygen sensor 18, 18*.

The third contribution $\propto_{ADAT}$ is also determined depending on the integral action of the PID controller under stationary conditions (i.e., with stationary air flow rate $\dot{m}_A$ and fuel flow rate ṁF).

Figure 8:
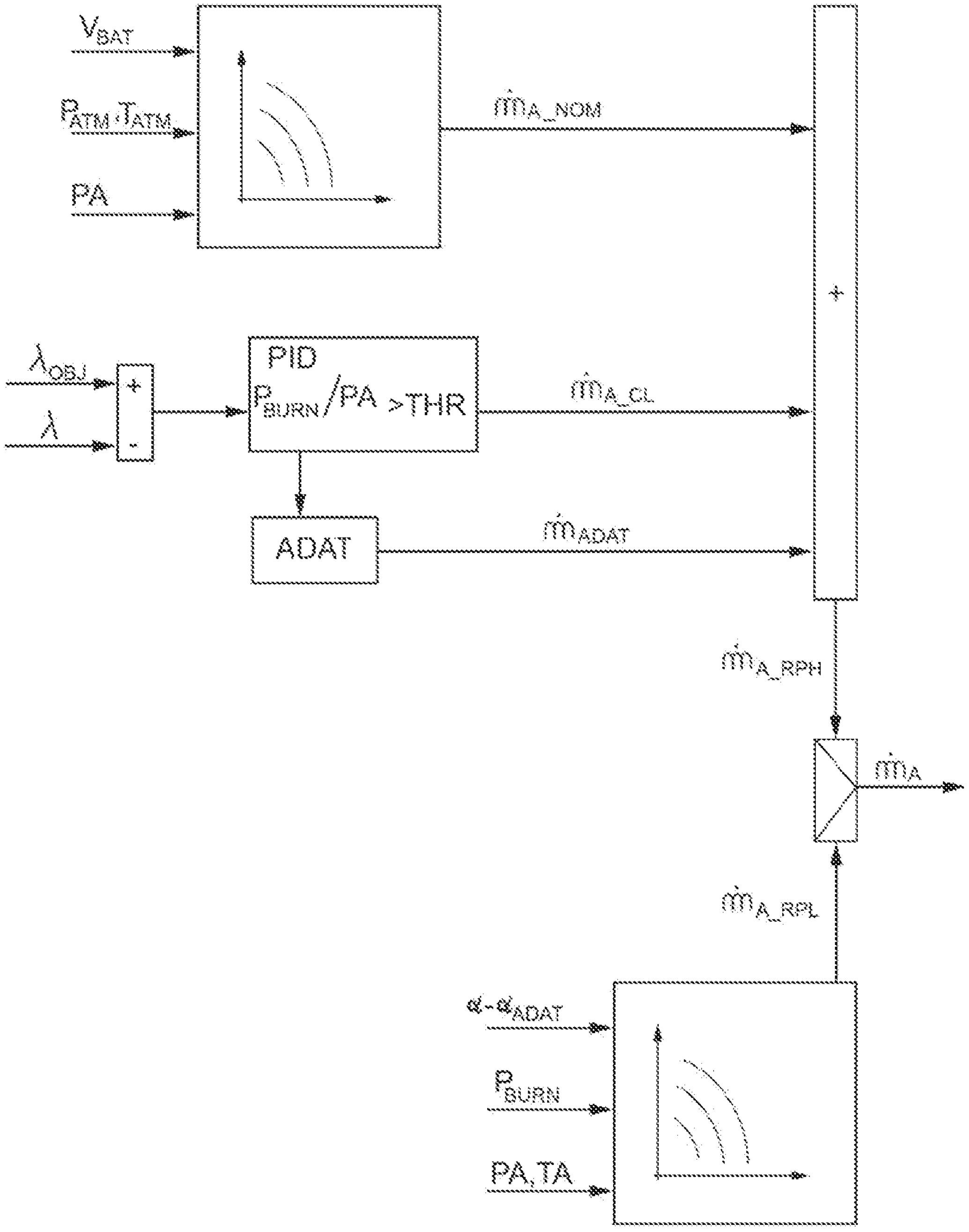

According to what is illustrated in FIG. 8, in the case where the ratio between the pressure $P_{BURN}$ of the air being fed to the burner 21 and the pressure $P_A$ of the air in the duct 25 is less than the threshold value THR, the third contribution $\propto_{ADAT}$ with which to operate the shut-off valve 26 is used to update the map used previously to determine the nominal passage section $\propto_{NOM}$ with which to operate the shut-off valve 26. In particular, the third contribution $\propto_{ADAT}$ is provided at input to the map together with further quantities that comprise the pressure $P_{BURN}$ of the air being fed to the burner 21, the pressure $P_A$ and the temperature $T_A$ of the air in the duct 25. The map provides at output the updated value of the air flow rate $\dot{m}_{A\_RPL}$.

In the case where the ratio between the pressure $P_{BURN}$ of the air being fed to the burner 21 and the pressure $P_A$ of the air in the duct 25 is greater than the threshold value THR, the value $V_{BAT}$ is instead provided at input to the map together with further quantities that comprise the ambient pressure $P_{ATM}$ and the ambient temperature $T_{ATM}$ provided by the sensor 37 and the pressure $P_A$ of the air in the duct 25 provided by the sensor 33. The map provides at output the nominal value of the air flow rate $\dot{m}_{A\_NOM}$.

However, the air flow rate $\dot{m}_{A\_RPH}$ is defined by the sum of the nominal value of the air flow rate $\dot{m}_{A\_NOM}$ and two further contributions.

In particular, the nominal value of the air flow rate $\dot{m}_{A\_NOM}$ represents the open-loop contribution and is precisely generated using the experimentally derived control map. The closed-loop contribution $\dot{m}_{A\_CL}$ is provided by means of a PID controller which tries to zero an error in the air/fuel ratio, namely, a difference between the objective value $\lambda_{OBJ}$ of the air/fuel ratio and the actual value $\lambda$ of the air/fuel ratio measured by the UHEGO or UEGO type linear oxygen sensor 18, 18*.

The third contribution $\dot{m}_{A\_ADAT}$ is also determined depending on the integral action of the PID controller under stationary conditions (i.e., with stationary air flow rate $\dot{m}_A$ and fuel flow rate $\dot{m}_F$).

In the case where the sum of the closed-loop contribution $\propto_{CL}$ and the third contribution $\propto_{ADAT}$ is greater than a calibratable threshold value $THR_2$, a breakdown or fault is diagnosed.

In the case where the sum of the closed-loop contribution $\dot{m}_{A\_CL}$ and the third contribution $\dot{m}_{A\_ADAT}$ is greater than a calibratable threshold value $THR_3$, a breakdown or fault is diagnosed.

According to a third variant, the pumping device 24 is regulated by controlling the number N of revolutions while the shut-off valve 26 is produced with the variable/adjustable passage section (in other words, the shut-off valve 26 is not of the on/off type). Also in this case, the pressure sensor 38 is provided in the duct 25 downstream of the shut-off valve 26 to detect the pressure $P_{BURN}$ of the air being fed to the burner 21.

The electronic control unit ECU is therefore designed to determine the objective air flow rate $\dot{m}_{A\_OBJ}$ and the nominal fuel flow rate $\dot{m}_{F\_N}$ that are obtained by operating the pumping device 24, the shut-off valve 26, the pumping device 30 and the injector 27.

Figure 9:
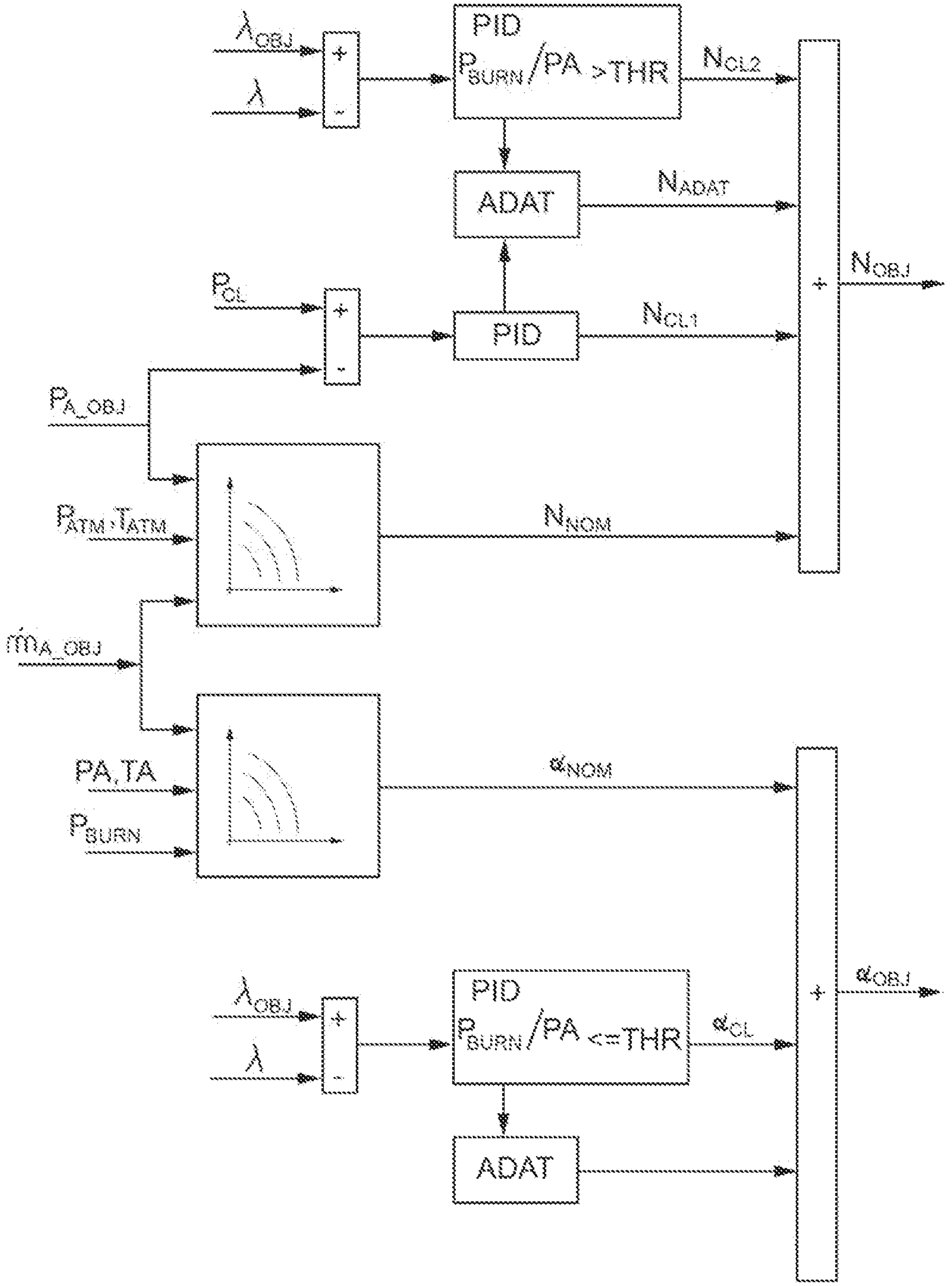

According to what is illustrated schematically in FIG. 9, the objective air flow rate $\dot{m}_{A\_OBJ}$ is provided at input to a map (typically provided by the manufacturer of the shut-off valve 26) together with further quantities that comprise the pressure $P_A$ and the temperature $T_A$ of the air provided by the sensor 33 and the pressure $P_{BURN}$ of the air being fed to the burner 21 provided by the sensor 38. The map provides at output the nominal passage section $\propto_{NOM}$ with which to operate the shut-off valve 26.

The actual passage section $\propto_{OBJ}$ with which to operate the shut-off valve 26 is, however, defined by the sum of the nominal passage section $\propto_{NOM}$ and any two further contributions.

In particular, the nominal passage section $\propto_{NOM}$ with which to operate the shut-off valve 26 represents the open-loop contribution and is precisely generated using the experimentally derived control map. In the case where the ratio between the pressure $P_{BURN}$ of the air being fed to the burner 21 and the pressure $P_A$ of the air is less than a threshold value THR, the closed-loop contribution $\propto_{CL}$ is provided by means of a PID controller which tries to zero an error in the air/fuel ratio, namely, a difference between the objective value $\lambda_{OBJ}$ of the air/fuel ratio and the actual value $\lambda$ of the air/fuel ratio measured by the UHEGO or UEGO type linear oxygen sensor 18, 18*.

The third contribution $\propto_{ADAT}$ is also determined depending on the integral action of the PID controller under stationary conditions (i.e., with stationary air flow rate $\dot{m}_A$ and fuel flow rate $\dot{m}_F$).

In addition, the objective air flow rate $\dot{m}_{A\_OBJ}$ is also provided at input to a map (typically provided by the manufacturer of the pumping device 24) together with further quantities that comprise the ambient pressure $P_{ATM}$ and the ambient temperature $T_{ATM}$ provided by the sensor 37 and the objective air pressure $P_{A\_OBJ}$ in the duct 25 (which is determined depending on the objective air flow rate $\dot{m}_{A\_OBJ}$ and on the pressure $P_{BURN}$ of the air being fed to the burner 21). The map provides at output the nominal number $N_{NOM}$ of revolutions with which to operate the pumping device 24.

The actual number N of revolutions with which to operate the pumping device 24 is, however, defined by the sum of the nominal number $N_{NOM}$ of revolutions and any three further contributions.

In particular, the nominal number $N_{NOM}$ of revolutions with which to operate the pumping device 24 represents the open-loop contribution and is precisely generated using the experimentally derived control map. The closed-loop contribution $N_{CL1}$ is provided by means of a $PID_1$ controller which tries to zero an error in the air pressure, namely, a difference between the objective air pressure $P_{A\_OBJ}$ in the duct 25 (which is determined depending on the objective air flow rate $\dot{m}_{A\_OBJ}$ and on the pressure $P_{BURN}$ of the air being fed to the burner 21) and the actual pressure value $P_A$ of the air measured by the sensor 33.

In addition, in the case where the ratio between the pressure $P_{BURN}$ of the air being fed to the burner 21 and the pressure $P_A$ of the air is greater than a threshold value THR, a further closed-loop contribution $N_{CL2}$ is provided by means of a $PID_2$ controller which tries to zero an error in the air/fuel ratio, namely, a difference between the objective value $\lambda_{OBJ}$ of the air/fuel ratio and the actual value $\lambda$ of the air/fuel ratio measured by the UHEGO or UEGO type linear oxygen sensor 18, 18*.

The third contribution $N_{ADAT}$ is also determined depending on the sum of the integral action of the $PID_1$ controller and of the $PID_2$ controller under stationary conditions (i.e., with stationary air flow rate $\dot{m}_A$ and fuel flow rate $\dot{m}_F$).

In other words, regulation of the air flow rate $\dot{m}_A$ is controlled depending on the ratio between the pressure $P_{BURN}$ of the air being fed to the burner 21 (downstream of the shut-off valve 26) and on the pressure $P_A$ of the air (upstream of the shut-off valve 26). When the said ratio is less than the threshold value THR, to control the air flow rate $\dot{m}_A$, the opening of the shut-off valve 26 is operated; since said ratio is greater than the threshold value THR, to control the air flow rate $\dot{m}_A$, the pumping device 24 is operated and the shut-off valve 26 is substantially fully open.

According to what is illustrated in FIG. 10, in the case where the ratio between the pressure $P_{BURN}$ of the air being fed to the burner 21 and the pressure $P_A$ of the air in the duct 25 is greater than the threshold value THR, the third contribution $N_{ADAT}$ with which to operate the pumping device 24 is used to update the map used previously to determine the nominal number $N_{NOM}$ of revolutions. In particular, the third contribution $N_{ADAT}$ is provided at input to the map together with further quantities that comprise the ambient pressure $P_{ATM}$ and the ambient temperature $T_{ATM}$ provided by the sensor 37 and the pressure $P_A$ of the air in the duct 25 provided by the sensor 33. The map provides at output the updated value of the air flow rate $\dot{m}_{A\_RPH}$.

On the other hand, in the case where the ratio between the pressure $P_{BURN}$ of the air being fed to the burner 21 and the pressure $P_A$ of the air in the duct 25 is less than the threshold value THR, the third contribution $\propto_{ADAT}$ with which to operate the shut-off valve 26 is used to update the map used previously to determine the nominal passage section $\propto_{NOM}$ with which to operate the shut-off valve 26. In particular, the third contribution $\propto_{ADAT}$ is provided at input to the map together with further quantities that comprise the pressure $P_{BURN}$ of the air being fed to the burner 21, the pressure $P_A$ and the temperature $T_A$ of the air in the duct 25. The map provides at output the updated value of the air flow rate $\dot{m}_{A\_RPL}$.

In the case where the sum of the closed-loop contribution $N_{CL}$ and the third contribution $N_{ADAT}$ is greater than a calibratable threshold value $THR_1$, a breakdown or fault is diagnosed.

In the case where the sum of the closed-loop contribution $\propto_{CL}$ and the third contribution $\propto_{ADAT}$ is greater than a calibratable threshold value $THR_2$, a breakdown or fault is diagnosed.

Figure 13:
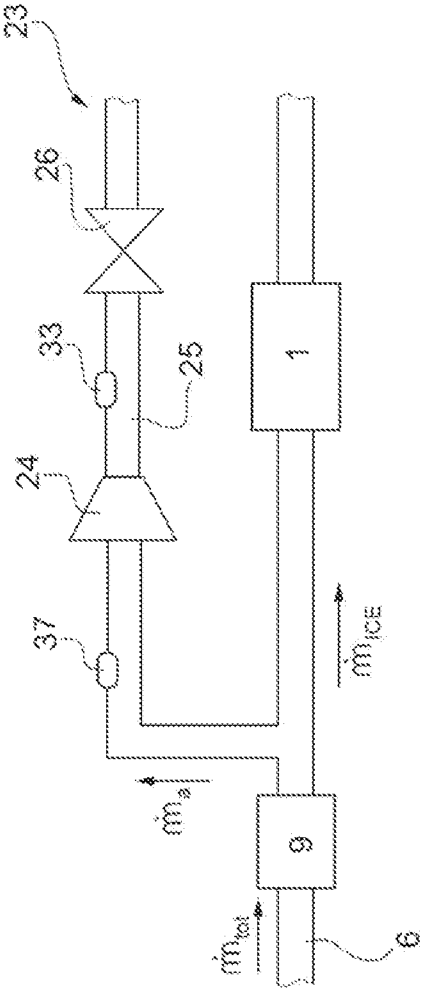
FIG. 13 schematically illustrates a detail of the internal combustion engine of FIG. 1.

According to a fourth variant schematically illustrated in FIG. 13, the pumping device 24 is regulated by controlling the number N of revolutions while the shut-off valve 26 is of the on/off type.

The electronic control unit ECU is designed to determine the objective air flow rate $\dot{m}_{A\_OBJ}$ and the nominal fuel flow rate $\dot{m}_{F\_N}$ that are obtained by operating the pumping device 24, the pumping device 30 and the injector 27.

According to what is illustrated schematically in FIG. 11, the objective air flow rate $\dot{m}_{A\_OBJ}$ is also provided at input to a map (typically provided by the manufacturer of the pumping device 24) together with further quantities that comprise the ambient pressure $P_{ATM}$ and the ambient temperature $T_{ATM}$ provided by the sensor 37 and the pressure $P_A$ of the air in the duct 25 provided by the sensor 33. The map provides at output the nominal number $N_{NOM}$ of revolutions with which to operate the pumping device 24.

The actual number N of revolutions with which to operate the pumping device 24 is, however, defined by the sum of the nominal number $N_{NOM}$ of revolutions and two further contributions.

In particular, the nominal number $N_{NOM}$ of revolutions with which to operate the pumping device 24 represents the open-loop contribution and is precisely generated using the experimentally derived control map; while the closed-loop contribution $N_{CL}$ is provided by means of a PID controller which tries to zero an error in the air flow rate, namely, a difference between the objective air flow rate $\dot{m}_{A\_OBJ}$ and the air flow rate $\dot{m}_A$.

In addition, according to what is illustrated in FIG. 13, the air flow rate $\dot{m}_A$ is calculated by subtracting the total air flow rate $\dot{m}_{TOT}$ detected by the mass air flow sensor 9 from the air flow rate $\dot{m}_{ICE}$ fed to the internal combustion engine 1. The air flow rate $\dot{m}_{ICE}$ fed to the internal combustion engine 1 is determined, for example, by the method to determine the mass of air trapped in each cylinder of an internal combustion engine described in the patent applications EP3650678 and EP3739192A, which are incorporated herein for reference.

The third contribution $N_{ADAT}$ is also determined depending on the integral action of the PID controller under stationary conditions (i.e., with stationary air flow rate $\dot{m}_A$ and fuel flow rate $\dot{m}_F$).

According to what is illustrated in FIG. 12, the third contribution $N_{ADAT}$ with which to operate the pumping device 24 is then used to update the map used previously to determine the nominal number $N_{NOM}$ of revolutions. In particular, the difference between the actual number N of revolutions with which to operate the pumping device 24 and the third contribution $N_{ADAT}$ is provided at input to the map together with further quantities that comprise the ambient pressure $P_{ATM}$ and the ambient temperature $T_{ATM}$ provided by the sensor 37 and the pressure $P_A$ of the air in the duct 25 provided by the sensor 33. The map provides at output the updated value of the air flow rate $\dot{m}_A$.

In the case where the sum of the closed-loop contribution $N_{CL}$ and the third contribution $N_{ADAT}$ is greater than a calibratable threshold value $THR_1$, a breakdown or fault is diagnosed.

Figure 14:
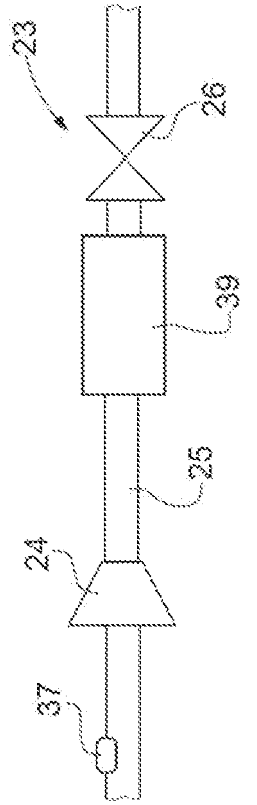
FIG. 14 schematically illustrates a further embodiment of a detail of FIG. 3.

According to a fifth and final variant illustrated schematically in FIG. 14, the pumping device 24 is regulated by controlling the number N of revolutions while the shut-off valve 26 is of the on/off type. A mass air flow sensor 39 (better known as Air Flow Meter) is also arranged along the duct 25, interposed between the pumping device 24 and the shut-off valve 26.

According to a further embodiment (not illustrated), the mass air flow sensor is arranged along the duct 25 upstream of the pumping device 24.

The electronic control unit ECU is therefore designed to determine the objective air flow rate $\dot{m}_{A\_OBJ}$ and the nominal fuel flow rate $\dot{m}_{F\_N}$ that are obtained by operating the pumping device 24, the pumping device 30 and the injector 27.

According to what is illustrated schematically in FIG. 11, the objective air flow rate $\dot{m}_{A\_OBJ}$ is also provided at input to a map (typically provided by the manufacturer of the pumping device 24) together with further quantities that comprise the ambient pressure $P_{ATM}$ and the ambient temperature $T_{ATM}$ provided by the sensor 37 and the pressure $P_A$ of the air in the duct 25 provided by the sensor 33. The map provides at output the nominal number $N_{NOM}$ of revolutions with which to operate the pumping device 24.

The actual number N of revolutions with which to operate the pumping device 24 is, however, defined by the sum of the nominal number $N_{NOM}$ of revolutions and two further contributions.

In particular, the nominal number $N_{NOM}$ of revolutions with which to operate the pumping device 24 represents the open-loop contribution and is precisely generated using the experimentally derived control map; while the closed-loop contribution $N_{CL}$ is provided by means of a PID controller which tries to zero an error in the air flow rate, namely, a difference between the objective air flow rate $\dot{m}_{A\_OBJ}$ and the air flow rate $\dot{m}_A$ detected by the mass air flow sensor 39.

The third contribution $N_{ADAT}$ is also determined depending on the integral action of the PID controller under stationary conditions (i.e., with stationary air flow rate $\dot{m}_A$ and fuel flow rate $\dot{m}_F$).

According to what is illustrated in FIG. 12, the third contribution $N_{ADAT}$ with which to operate the pumping device 24 is then used to update the map used previously to determine the nominal number $N_{NOM}$ of revolutions. In particular, the third contribution $N_{ADAT}$ is provided at input to the map together with further quantities that comprise the ambient pressure $P_{ATM}$ and the ambient temperature $T_{ATM}$ provided by the sensor 37 and the pressure $P_A$ of the air in the duct 25 provided by the sensor 33. The map provides at output the updated value of the air flow rate $\dot{m}_A$.

In the case where the sum of the closed-loop contribution $N_{CL}$ and the third contribution $N_{ADAT}$ is greater than a calibratable threshold value $THR_1$, a breakdown or fault is diagnosed.

Figure 5:
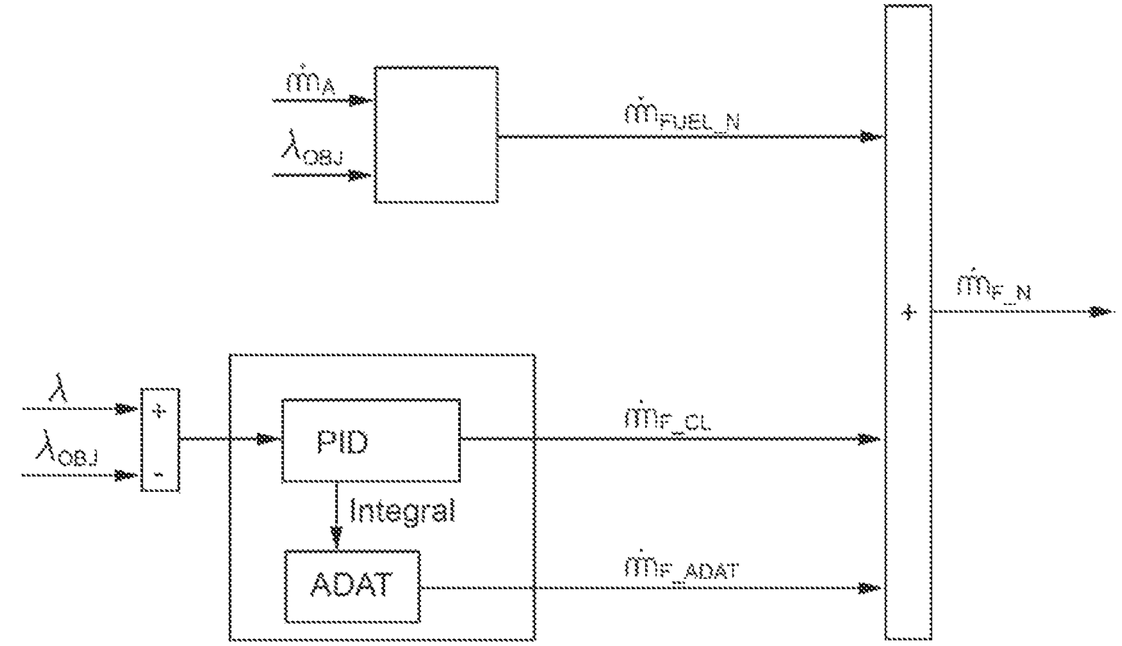
FIG. 5 is a block diagram that schematically illustrates the method to control the fuel flow rate object of the present invention.

According to what is schematically illustrated in FIG. 5, once the electronic control unit ECU has determined the actual number N of revolutions with which to operate the pumping device 24 to obtain the objective air flow rate $\dot{m}_{A\_OBJ}$, the nominal fuel flow rate $\dot{m}_{F\_N}$ is calculated.

The nominal fuel flow rate $\dot{m}_{F\_N}$ is determined by the following formula:

$$\dot{m}_{FUEL\text{-}N} = \frac{\dot{m}_A}{\left(\frac{A}{F_{STEC}} * \lambda_{OBJ}\right)}$$

$\dot{m}_{FUEL\text{-}N}$ nominal fuel flow rate $\dot{m}_A$ estimated air flow rate $A/F_{STEC}$ stoichiometric air and fuel ratio $\lambda_{OBJ}$ desired/objective value of the air/fuel ratio.

The estimated air flow rate $\dot{m}_A$ is determined according to the method illustrated in FIG. 6 and described in the preceding disclosure.

The objective fuel flow rate $\dot{m}_{F\_OBJ}$ is, however, defined by the sum of the nominal fuel flow rate $\dot{m}_{F\_N}$ and two further contributions.

In particular, the nominal fuel flow rate $\dot{m}_{F\_N}$ represents the open-loop contribution and is precisely generated using the formula described previously; while the closed-loop contribution $\dot{m}_{F\_CL}$ of the fuel flow rate is provided by a PID controller which tries to zero an error in the air/fuel ratio, namely, a difference between the objective value $\lambda_{OBJ}$ of the air/fuel ratio and the actual value $\lambda$ of the air/fuel ratio measured by the UHEGO or UEGO type linear oxygen sensor 18, 18*.

The third contribution $\dot{m}_{F\_ADAT}$ of the fuel flow rate is also determined depending on the integral action of the PID controller under stationary conditions (i.e., with stationary air flow rate $\dot{m}_A$ and fuel flow rate $\dot{m}_F$).

In the case where the sum of the closed-loop contribution $\dot{m}_{F\_CL}$ and the third contribution $\dot{m}_{F\_ADAT}$ is greater than a calibratable threshold value $THR_4$, a breakdown or fault is diagnosed.

In the case of a fault of the mass air flow sensor 9 or 39, the air flow rate $\dot{m}_A$ is calculated by means of a map depending on the ambient pressure $P_{ATM}$, on the ambient temperature $T_{ATM}$ and on the pressure $P_A$ of the air entering the burner 21, the actual number N of revolutions with which to operate the pumping device 24, and the further adaptive contribution $N_{ADAT}$ of the number of revolutions with which to operate the pumping device 24.

It is clear that the strategies described in the previous disclosure to control and adapt the objective fuel flow rate $\dot{m}_{F\_OBJ}$ and the air flow rate $\dot{m}_A$ may be used with any layout of the exhaust system 2 (regardless of the position of the linear oxygen sensor 18, 18*).

It is also clear that the previous disclosure may also find advantageous application in the case where the linear oxygen sensor 18, 18*, 18** is replaced by a lambda sensor suited to provide a binary on/off type output (indicating whether the exhaust gases titer is above or below the stoichiometric value).

In particular, the strategies described in the previous disclosure may also find advantageous application in the case of a linear oxygen sensor 18 housed along the outlet duct 35**.

LIST OF REFERENCE NUMBERS

1 internal combustion engine
2 exhaust system
3 cylinders
4 intake manifold
5 exhaust manifold
6 intake duct
7 air filter
8 throttle valve
9 mass air flow sensor
10 exhaust duct
11 turbocompressor
12 turbine
13 compressor
14 after-treatment system
15 precatalytic converter
16 particulate filter
17 catalytic converter
18 UEHO linear sensor or HEGO switching
19 lambda sensor
20 lambda sensor
21 burner
22 combustion chamber
23 air feeding circuit
24 pumping device
25 duct
26 shut-off valve
27 injector
28 spark plug
29 fuel feeding circuit
30 pumping device
31 duct
32 control system
33 sensor P, T
34 sensor P, T
35 outlet duct*
36 sensor P, T
37 sensor P, T
38 pressure sensor*
39 mass air flow sensor

The invention claimed is:

1. A method to control an internal combustion engine (1) provided with a mass flow sensor (9; 39) and with an exhaust system (2) for the exhaust gases of a motor vehicle having an exhaust duct (10) and an exhaust gas after-treatment system (14) comprising at least one catalytic converter (15, 17) arranged along the exhaust duct (10); a burner (21), which is suited to introduce exhaust gases into the exhaust duct (10) so as to speed up a heating of said at least one catalytic converter (15, 17), wherein inside the burner (21) there is defined a combustion chamber (22), which receives fuel from an injector (27), which is designed to inject fuel into the combustion chamber (22), and fresh air through an air feeding device (23), which is provided with a pumping device (24) feeding air, and with a shut-off valve (26) arranged upstream of the burner (21); the method comprises the following steps:

calculating a thermal power ($P_{OBJ}$) needed to reach a nominal operating temperature of said at least one catalytic converter (15, 17);

determining an objective air flow rate ($\dot{m}_{A\_OBJ}$) to be fed to the burner (21) in order to obtain said thermal power ($P_{OBJ}$) needed to reach the nominal operating temperature of said at least one catalytic converter (15, 17);

determining a nominal number ($N_{NOM}$) of revolutions with which to operate the pumping device (24) by means of a map depending on the objective air flow rate ($\dot{m}_{A\_OBJ}$), on an ambient pressure ($P_{ATM}$), on an ambient temperature ($T_{ATM}$) and on a pressure ($P_A$) of the air flowing into the burner (21);

determining a closed-loop contribution ($N_{CL}$) of the number of revolutions with which to operate the pumping device (24) by means of a PID controller, which zeroes a difference between the objective air flow rate ($\dot{m}_{A\_OBJ}$) and an air flow rate ($\dot{m}_A$) determined through the mass flow sensor (9; 39);

determining a further contribution ($N_{ADAT}$) of the number of revolutions with which to operate the pumping device (24) depending on an integral action of the PID controller under stationary conditions;

determining an actual number (N) of revolutions with which to operate the pumping device (24) by means of a sum of the nominal number ($N_{NOM}$) of revolutions, of the closed-loop contribution ($N_{CL}$) of the number of revolutions with which to operate the pumping device (24) and of the further contribution ($N_{ADAT}$) of the number of revolutions with which to operate the pumping device (24); and operating the pumping device (24) according to the actual number (N) of revolutions.

2. The method according to claim 1, wherein the mass flow sensor (9) is housed along an intake duct (6) feeding fresh air to the internal combustion engine (1) and to the burner (21).

3. The method according to claim 2 comprising the further step of calculating an air flow rate ($\dot{m}_A$) by subtracting an air flow ($\dot{m}_{ICE}$) fed to the internal combustion engine (1) from a total air flow rate ($\dot{m}_{TOT}$) detected by the mass flow sensor (9).

4. The method according to claim 1, wherein the mass flow sensor (39) is housed along a first duct (25), interposed between the pumping device (24) and the shut-off valve (26).

5. The method according to claim 1, wherein the mass flow sensor is housed along a first duct (25), upstream of the pumping device (24).

6. The method according to claim 1 comprising the further step of signalling a fault when a sum of the closed-loop contribution ($N_{CL}$) of the number of revolutions and of the further contribution ($N_{ADAT}$) of the number of revolutions with which to operate the pumping device (24) exceeds a predetermined threshold value ($THR_1$).

7. The method according to claim 1 comprising the further step of determining a nominal fuel flow rate ($\dot{m}_{FUEL\_N}$) to be fed to the burner (21) by means of the following formula:

$$\dot{m}_{FUEL-N} = \frac{\dot{m}_A}{\left(\frac{A}{F_{STEC}} * \lambda_{OBJ}\right)}$$

$\dot{m}_{FUEL-N}$ nominal fuel flow rate;

$\dot{m}_A$ flow rate measured with the mass air flow sensor (9; 39);

$A/F_{STEC}$ stoichiometric air and fuel ratio;

$A_{OBJ}$ objective value of an air/fuel ratio.

8. The method according to claim 7 comprising the further steps of:

determining a closed-loop contribution ($\dot{m}_{F\_CL}$) of a fuel flow rate by means of the PID controller, which zeroes a difference between an objective value ($\lambda_{OBJ}$) of the air/fuel ratio and an actual value (2) of the air/fuel ratio measured by an oxygen sensor (18, 18*, 18**);

determining a further contribution ($\dot{m}_{F\_ADAT}$) of the fuel flow rate depending on the integral action of the PID controller under stationary conditions; and determining an objective fuel flow rate ($\dot{m}_{F\_OBJ}$) by means of a sum of the nominal fuel flow rate ($\dot{m}_{FUEL\_N}$), of the closed-loop contribution ($\dot{m}_{F\_CL}$) of the fuel flow rate and of the further contribution ($\dot{m}_{F\_ADAT}$) of the fuel flow rate.

9. The method according to claim 8 comprising the further step of signalling a fault when a sum of the closed-loop contribution ($\dot{m}_{F\_CL}$) and of the further contribution ($\dot{m}_{F\_ADAT}$) of the fuel flow rate exceeds a predetermined threshold value.

10. The method according to claim 1, wherein, in a case of a fault of the mass flow sensor (9; 39), the air flow rate ($\dot{m}_A$) is calculated by means of a map depending on the ambient pressure ($P_{ATM}$), on the ambient temperature ($T_{ATM}$), on the pressure ($P_A$) of the air flowing into the burner (21), on the actual number (N) of revolutions with which to operate the pumping device (24) and on the further contribution ($N_{ADAT}$) of the number of revolutions with which to operate the pumping device (24).

* * * * *